United States Patent
Saba et al.

(10) Patent No.: US 12,421,378 B2
(45) Date of Patent: Sep. 23, 2025

(54) ENHANCED AGING AND REDUCED SHRINKBACK POLYMERIC COMPOSITION

(71) Applicant: Dow Global Technologies LLC, Midland, MI (US)

(72) Inventors: Stacey A. Saba, Eaglesville, PA (US); Mohamed Esseghir, Lawrenceville, NJ (US); Theo Geussens, Samstagern (CH); Yushan Hu, Pearland, TX (US); Brayden E. Glad, Manvel, TX (US); Andrew T. Heitsch, Angleton, TX (US); Buu-Dang Nguyen, Gilbertsville, PA (US)

(73) Assignee: Dow Global Technologies LLC, Midland, MI (US)

( * ) Notice: Subject to any disclaimer, the term of this patent is extended or adjusted under 35 U.S.C. 154(b) by 393 days.

(21) Appl. No.: 18/004,221

(22) PCT Filed: Oct. 4, 2021

(86) PCT No.: PCT/US2021/053349
§ 371 (c)(1),
(2) Date: Jan. 4, 2023

(87) PCT Pub. No.: WO2022/076296
PCT Pub. Date: Apr. 14, 2022

(65) Prior Publication Data
US 2023/0265269 A1    Aug. 24, 2023

Related U.S. Application Data

(60) Provisional application No. 63/089,585, filed on Oct. 9, 2020.

(51) Int. Cl.
C08L 23/08 (2025.01)
C08L 23/0807 (2025.01)

(52) U.S. Cl.
CPC ..... C08L 23/0815 (2013.01); *C08L 2203/206* (2013.01); *C08L 2205/025* (2013.01); *C08L 2205/03* (2013.01); *C08L 2207/062* (2013.01)

(58) Field of Classification Search
CPC ........... C08L 23/0815; C08L 2203/206; C08L 2205/025; C08L 2205/03; C08L 2207/062; C08L 2203/202; C08L 71/02
See application file for complete search history.

(56) References Cited

U.S. PATENT DOCUMENTS

| | | | | |
|---|---|---|---|---|
| 5,718,974 A | * | 2/1998 | Kmiec | C08L 23/0815 428/401 |
| 6,180,721 B1 | * | 1/2001 | Rogestedt | H01B 3/441 174/105 R |
| 2003/0114594 A1 | | 6/2003 | Starita | |
| 2003/0139530 A1 | | 7/2003 | Starita | |
| 2005/0004316 A1 | | 1/2005 | Starita | |
| 2005/0261435 A1 | | 11/2005 | Starita | |
| 2007/0213468 A1 | | 9/2007 | Wilson et al. | |
| 2015/0294755 A1 | * | 10/2015 | Zhou | C09D 123/0815 428/394 |
| 2015/0315401 A1 | * | 11/2015 | Lee | G02B 6/4486 385/100 |
| 2019/0161602 A1 | | 5/2019 | Chang et al. | |
| 2019/0291933 A1 | * | 9/2019 | Nunez | B32B 27/308 |

FOREIGN PATENT DOCUMENTS

| | | |
|---|---|---|
| CN | 104292596 | 1/2015 |
| CN | 105922699 | 9/2016 |
| EP | 3390524 | 10/2018 |
| WO | 199965039 | 12/1999 |
| WO | 2004007610 | 1/2004 |
| WO | 2005068076 | 7/2005 |
| WO | 2006045550 | 5/2006 |
| WO | 2014099360 | 6/2014 |
| WO | 2015121161 | 8/2015 |

OTHER PUBLICATIONS

International Preliminary Report on Patentability for corresponding International Application No. PCT/US2021/053349 dated Mar. 28, 2023.
Balke, "A Strategy for Interpreting Multidetector Size-Exclusion Chromatography Data I" 1992, Chapter 12, p. 180-198.
Balke, "A Strategy for Interpreting Multidetector Size-Exclusion Chromatography Data II" 1992, Chapter 13, p. 199-219.
Kratochvil, "Fundamental Light-Scattering Methods" 1987, p. 113-144.
Williams, "The Construction of a Polyethylene Calibration Curve for Gel Permeation Chromatography using Polystyrene Fractions," 1968, vol. 6, p. 621-624.

(Continued)

*Primary Examiner* — Alicia Bland
(74) *Attorney, Agent, or Firm* — Mark A. Twilley

(57) ABSTRACT

A polymeric composition includes (i) a copolymer of ethylene and an alpha olefin comonomer, the copolymer having a density of 0.945 g/cc to 0.960 g/cc, (ii) an ethylene-based polymer, and (iii) polyethylene glycol. The combination of (i) and (ii) has a High Mw Comonomer Content of 3.2 wt % or greater based on a total weight of the combined (i) and (ii) over the weight average molecular weight range of $10^5$ g/mol to $10^{5.5}$ g/mol as measured by GPC, wherein 15 wt % or greater of the total weight of the polymeric composition is the combined (i) and (ii) having a molecular weight in the range of $10^5$ g/mol to $10^{5.5}$ g/mol as measured by GPC, wherein the polymeric composition has a Relevant Comonomer Content of 0.6 wt % or greater and wherein the polymeric composition has a density of 0.945 g/cc or greater as measured according to ASTM D792.

10 Claims, No Drawings

(56) References Cited

OTHER PUBLICATIONS

Zimm, "Apparatus and Methods for Measurement and Interpretation of the Angular Variation of Light Scattering; Preliminary Results on Polystyrene Solutions" 1948, vol. 16, p. 1099-1116.

* cited by examiner

ENHANCED AGING AND REDUCED SHRINKBACK POLYMERIC COMPOSITION

BACKGROUND

Field of the Invention

The present disclosure generally relates to polymeric compositions and more specifically to polymeric compositions exhibiting enhanced aging properties and reduced shrinkback.

INTRODUCTION

Fiber optic cables are useful for transmitting data at high rates across long distances and as such are subject to increasing use. Fiber optics cables are trending toward down gauging and light weighting which requires new mini- and micro-cable technology for high fiber density constructions. Due to the thin walls and high extrusion speeds used in the fabrication of these fiber optic cables, the performance properties of polymeric jacketing on the cables are particularly important. A first property the polymeric jacketing must exhibit is a density of 0.945 grams per cubic centimeter ("g/cc") or higher such that the polymeric jacketing is sufficiently stiff and exhibits a hardness that can resist abuse. A second property the polymeric jacketing material must exhibit is a cyclic temperature shrinkback of 2.5% or less to minimize signal attenuation. A third property the polymeric jacketing must exhibit is a retained tensile elongation at break of 75% or greater after heat aging to ensure cable longevity. A fourth property the polymeric jacketing must exhibit is an environmental stress crack resistance ("ESCR") of 400 hours or greater to again ensure cable longevity.

Conventional approaches to addressing the first property have been to include high-density polyethylene ("HDPE") in the jacketing material. HDPE is a cost-effective jacketing material that generally exhibits increased strength due to high crystallinity and a density of 0.945 g/cc or greater. The morphology of the HDPE is a plurality of crystallites and amorphous tie molecule phases holding the crystallite phases together. HDPE provides the crystallinity to the polymeric composition necessary to address the first property, but the architecture of some HDPEs makes it prone to cyclic temperature shrinkback, loss of mechanical properties after heat aging, and a low ESCR leading to a degradation of the second, third, and fourth properties.

Attempts at addressing the shortcomings of HDPE for cable jacketing's have been reported. For example, World Intellectual Property Organization publication number 2014/099360A1 ("the '360 publication") discloses the use of a bimodal HDPE and modifying components to address performance issues with a polymeric jacketing. The '360 publication explains that HDPE and polymeric architecture is already near optimal and that further investments would increase turnaround times and costs and instead incorporates the modifying component to improve cyclic temperature shrinkage.

Accordingly, it would be surprising to discover a polymeric composition useful as a cable jacketing that exhibits a density of 0.945 g/cc or greater, a cyclic temperature shrinkback of 2.5% or less, a retained tensile elongation at break of 75% after heat aging, and an ESCR of 400 hours or greater as a result of modifying polymer architecture.

SUMMARY OF THE INVENTION

The present invention offers a polymeric composition useful as a cable jacketing that exhibits a density of 0.945 g/cc or greater, a cyclic temperature shrinkage of 2.5% or less, a retained tensile elongation at break of 75% after heat aging, and an unconditioned ESCR of 400 or greater as a result of modifying polymer architecture.

The present invention is a result of discovering that by utilizing a blend of polymers having an overall density of 0.945 g/cc and that exhibit a High Mw Comonomer Content of 3.2 wt % or greater over the molecular weight range of $10^5$ g/mol to $10^{5.5}$ g/mol and having a Relevant Comonomer Content of 0.6 wt % or greater, a polymeric composition can exhibit the above-noted properties. Under tensile load the tie chains orient along the tensile axis during the final deformation stage. Strong tie chains are required for strain hardening to occur and to meet the requirement of retained tensile elongation at break of 75% after heat aging. Without being bound by theory, it is believed that a High Mw Comonomer Content of 3.2 wt % or greater over the molecular weight range of $10^5$ g/mol to $10^{5.5}$ g/mol with a Relevant Comonomer Content of 0.6 wt % or greater strengthens the tie molecules between crystallites such that the density of the polymeric composition is 0.945 g/cc or greater but the polymeric composition's elongation at break and ESCR are strengthened. Further, the cyclic temperature shrinkback is maintained to less than 2.5%.

The present invention is particularly useful for cable jackets.

According to a first feature of the present disclosure, a polymeric composition comprises (i) a copolymer of ethylene and an alpha olefin comonomer, the copolymer having a density of 0.945 g/cc to 0.960 g/cc, (ii) an ethylene-based polymer, and (iii) polyethylene glycol. The combination of (i) and (ii) has a High Mw Comonomer Content of 3.2 wt % or greater based on a total weight of the combined (i) and (ii) over the weight average molecular weight range of $10^5$ g/mol to $10^{5.5}$ g/mol as measured by GPC, wherein 15 wt % or greater of the total weight of the polymeric composition is the combined (i) and (ii) having a molecular weight in the range of $10^5$ g/mol to $10^{5.5}$ g/mol as measured by GPC, wherein the polymeric composition has a Relevant Comonomer Content of 0.6 wt % or greater and wherein the polymeric composition has a density of 0.945 g/cc or greater as measured according to ASTM D792.

According to a second feature of the present disclosure, the polymeric composition comprises from 35 wt % to 85 wt % of the copolymer based on the total weight of the polymeric composition.

According to a third feature of the present disclosure, the polymeric composition comprises from 0.5 wt % to 1 wt % of the polyethylene glycol based on the total weight of the polymeric composition and the polyethylene glycol.

According to a fourth feature of the present disclosure, the polymeric composition comprises from 15 wt % to 30 wt % of the ethylene-based polymer based on the total weight of the polymeric composition, and the ethylene based polymer is a linear low-density polyethylene having a density of 0.91 g/cc to 0.93 g/cc as measured according to ASTM D792.

According to a fifth feature of the present disclosure, the polymeric composition comprises from 15 wt % to 19 wt % of the ethylene based polymer based on the total weight of the polymeric composition and the ethylene based polymer is a plastomer having a density of 0.90 g/cc to 0.91 g/cc as measured according to ASTM D792.

According to a sixth feature of the present disclosure, the polymeric composition comprises from 45 wt % to 55 wt % of the ethylene-based polymer based on the total weight of the polymeric composition and the ethylene-based polymer is a high-density polyethylene having a density of 0.93 g/cc to 0.95 g/cc as measured according to ASTM D792.

According to a seventh feature of the present disclosure, the polymeric composition comprises from 10 wt % to 15 wt % of the ethylene-based polymer based on the total weight of the polymeric composition and the ethylene based polymer is an elastomer having a density of 0.80 g/cc to 0.90 g/cc as measured according to ASTM D792.

According to an eighth feature of the present disclosure, the combination of (i) and (ii) has a High Mw Comonomer Content of 12.0 wt % or less over the molecular weight range of $10^5$ g/mol to $10^{5 \cdot 5}$ g/mol as measured by GPC.

According to a ninth feature of the present disclosure, 30 wt % or less of the total weight of the polymeric composition is the combined (i) and (ii) having a molecular weight in the range of $10^5$ g/mol to $10^{5.5}$ g/mol as measured by GPC.

According to a tenth feature of the present disclosure, a coated conductor comprises a conductor; and the polymeric composition disposed at least partially around the conductor.

DETAILED DESCRIPTION

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B. and C in combination.

All ranges include endpoints unless otherwise stated.

Test methods refer to the most recent test method as of the priority date of this document unless a date is indicated with the test method number as a hyphenated two-digit number. References to test methods contain both a reference to the testing society and the test method number. Test method organizations are referenced by one of the following abbreviations: ASTM refers to ASTM International (formerly known as American Society for Testing and Materials); IEC refers to International Electrotechnical Commission; EN refers to European Norm; DIN refers to Deutsches Institut für Normung; and ISO refers to International Organization for Standards.

As used herein, the term weight percent ("wt %") designates the percentage by weight a component is of a total weight of the polymeric composition unless otherwise specified.

Melt index ($I_2$) values herein refer to values determined according to ASTM method D1238 at 190 degrees Celsius (° C.) with 2.16 Kilogram (Kg) mass and are provided in units of grams eluted per ten minutes ("g/10 min."). Melt index ($I_{21}$) values herein refer to values determined according to ASTM method D1238 at 190 degrees Celsius (° C.) with 21.6 Kg mass and are provided in units of grams eluted per ten minutes g/10 min.

Density values herein refer to values determined according to ASTM D792 at 23° C. and are provided in units of grams per cubic centimeter ("g/cc").

As used herein, Chemical Abstract Services registration numbers ("CAS #") refer to the unique numeric identifier as most recently assigned as of the priority date of this document to a chemical compound by the Chemical Abstracts Service.

Polymeric Composition

The polymeric composition comprises a copolymer of ethylene and an alpha olefin comonomer, an ethylene-based polymer, and polyethylene glycol. The polymeric composition, in an unfilled state, has a density of 0.945 g/cc to 0.970 g/cc. For example, the unfilled density of the polymeric composition may be 0.945 g/cc or greater, or 0.946 g/cc or greater, or 0.948 g/cc or greater, or 0.950 g/cc or greater, or 0.952 g/cc or greater, or 0.954 g/cc or greater, or 0.955 g/cc or greater, or 0.956 g/cc or greater, or 0.958 g/cc or greater, or 0.960 g/cc or greater, or 0.962 g/cc or greater, or 0.964 g/cc or greater, or 0.966 g/cc or greater, or 0.968 g/cc or greater, while at the same time, 0.970 g/cc or less, or 0.968 g/cc or less, or 0.966 g/cc or less, or 0.964 g/cc or less, or 0.962 g/cc or less, or 0.960 g/cc or less, or 0.958 g/cc or less, or 0.956 g/cc or less, or 0.954 g/cc or less, or 0.952 g/cc or less, or 0.950 g/cc or less, or 0.948 g/cc or less, or 0.946 g/cc or less. As defined herein, the "unfilled state" of the polymeric composition sis defined as the polymeric composition consisting essentially of the copolymer of ethylene and an alpha olefin comonomer, the ethylene-based polymer, and the polyethylene glycol.

Copolymer

One component of the polymeric composition is a copolymer of ethylene and an alpha olefin comonomer. "Polymer" means a macromolecular compound comprising a plurality of monomers of the same or different type which are bonded together. "Copolymer" means a polymer prepared from two different monomer types. The copolymer can include ethylene and one or more $C_3$-$C_{20}$ α-olefin comonomers such as propylene, 1-butene, 1 pentene, 4-methyl-1-pentene, 1-hexene, and 1-octene. The copolymer can have a unimodal or a multimodal molecular weight distribution. As used herein, "unimodal" denotes a polymeric material having a molecular weight distribution ("MWD") such that its gel permeation chromatography ("GPC") curve exhibits only a single peak with no discernible second peak, or even a shoulder or hump, relative to such single peak. In contrast, as used herein, "bimodal" means that the MWD in a GPC curve exhibits the presence of two component polymers, such as by having two peaks or where one component may be indicated by a hump, shoulder, or tail relative to the peak of the other component polymer.

The copolymer may comprise 50 wt % or greater, 60 wt % or greater, 70 wt % or greater, 80 wt % or greater, 85 wt % or greater, 90 wt % or greater, or 91 wt % or greater, or 92 wt % or greater, or 93 wt % or greater, or 94 wt % or greater, or 95 wt % or greater, or 96 wt % or greater, or 97 wt % or greater, or 97.5 wt % or greater, or 98 wt % or greater, or 99 wt % or greater, while at the same time, 99.5 wt % or less, or 99 wt % or less, or 98 wt % or less, or 97 wt % or less, or 96 wt % or less, or 95 wt % or less, or 94 wt % or less, or 93 wt % or less, or 92 wt % or less, or 91 wt % or less, or 90 wt % or less, or 85 wt % or less, or 80 wt % or less, or 70 wt % or less, or 60 wt % or less of ethylene as measured using Nuclear Magnetic Resonance (NMR) or Fourier-Transform Infrared (FTIR) Spectroscopy.

The copolymer may be a high-density polyethylene ("HDPE"). The copolymer can be prepared with either Ziegler-Natta, chromium-based, constrained geometry or metallocene catalysts in slurry reactors, gas phase reactors or solution reactors. The copolymer includes at least 50 wt % ethylene polymerized therein, or at least 70 wt %, or at least 80 wt %, or at least 85 wt %, or at least 90 wt %, or at least 95 wt % ethylene in polymerized form based on the weight of the ethylene-based polymer as determined by nuclear magnetic resonance spectroscopy.

The copolymer has a density of 0.945 g/cc to 0.960 g/cc. For example, the density of the copolymer may be 0.945 g/cc or greater, or 0.946 g/cc or greater, or 0.948 g/cc or greater, or 0.950 g/cc or greater, or 0.952 g/cc or greater, or 0.954 g/cc or greater, or 0.955 g/cc or greater, or 0.956 g/cc or greater, or 0.958 g/cc or greater, while at the same time, 0.960 g/cc or less, or 9.58 g/cc or less, or 9.56 g/cc or less, or 0.955 g/cc or less, or 9.54 g/cc or less, or 9.52 g/cc or less, or 9.50 g/cc or less, or 9.48 g/cc or less, or 9.46 g/cc or less as measured according to ASTM D792. The copolymer may have a melt index ($I_2$) of 0.1 g/10 min. or greater, or 0.3 g/10 min. or greater, or 0.5 g/10 min. or greater, or 1.0 g/10 min. or greater, or 1.5 g/10 min. or greater, or 2.0 g/10 min. or greater, or 2.5 g/10 min. or greater, or 3.0 g/10 min. or greater, or 3.5 g/10 min. or greater, or 4.0 g/10 min. or greater, or 4.5 g/10 min. or greater, or 5.0 g/10 min. or greater, or 5.5 g/10 min. or greater, or 6.0 g/10 min. or greater, or 6.5 g/10 min. or greater, or 7.0 g/10 min. or greater, or 7.5 g/10 min. or greater, or 8.0 g/10 min. or greater, or 8.5 g/10 min. or greater, or 9.0 g/10 min. or greater, or 9.5 g/10 min. or greater, while at the same time, 10.0 g/10 min. or less, or 9.5 g/10 min. or less, or 9.0 g/10 min. or less, or 8.5 g/10 min. or less, or 8.0 g/10 min. or less, or 7.5 g/10 min. or less, or 7.0 g/10 min. or less, or 6.5 g/10 min. or less, or 6.0 g/10 min. or less, or 5.5 g/10 min. or less, or 5.0 g/10 min. or less, or 4.5 g/10 min. or less, or 4.0 g/10 min. or less, or 3.5 g/10 min. or less, or 3.0 g/10 min. or less, or 2.5 g/10 min. or less, or 2.0 g/10 min. or less, or 1.5 g/10 min. or less, or 1.0 g/10 min. or less, or 0.5 g/10 min. or less, or 0.3 g/10 min. or less.

The copolymer may have a melt index ($I_{21}$) of 90 g/10 min. or greater, or 92 g/10 min. or greater, or 94 g/10 min. or greater, or 96 g/10 min. or greater, or 98 g/10 min. or greater, or 100 g/10 min. or greater, or 102 g/10 min. or greater, or 104 g/10 min. or greater, or 106 g/10 min. or greater, or 108 g/10 min. or greater, or 110 g/10 min. or greater, or 112 g/10 min. or greater, or 114 g/10 min. or greater, or 116 g/10 min. or greater, or 118 g/10 min., while at the same time, 120 g/10 min. or less, or 118 g/10 min. or less, or 116 g/10 min. or less, or 114 g/10 min. or less, or 112 g/10 min. or less, or 110 g/10 min. or less, or 108 g/10 min. or less, or 106 g/10 min. or less, or 104 g/10 min. or less, or 102 g/10 min. or less, or 100 g/10 min. or less, or 98 g/10 min. or less, or 96 g/10 min. or less, or 94 g/10 min. or less, or 92 g/10 min. or less.

The polymeric composition may comprise from 35 wt % to 80 wt % of the copolymer. For example, the polymeric composition may comprise 35 wt % or greater, or 40 wt % or greater, or 45 wt % or greater, or 50 wt % or greater, or 55 wt % or greater, or 60 wt % or greater, or 65 wt % or greater, or 70 wt % or greater, or 75 wt % or greater, or 80 wt % or greater, while at the same time, 85 wt % or less, or 80 wt % or less, or 75 wt % or less, or 70 wt % or less, or 65 wt % or less, or 60 wt % or less, or 55 wt % or less, or 50 wt % or less, or 45 wt % or less, or 40 wt % or less of the copolymer based on a total weight of the polymeric composition.

Ethylene-Based Polymer

As noted above, the polymeric composition comprises the ethylene-based polymer. As used herein, "ethylene-based" polymers are polymers in which greater than 50 wt % of the monomers are ethylene though other co-monomers may also be employed. The ethylene-based polymer can include ethylene and one or more $C_3$-$C_{20}$ α-olefin comonomers such as propylene, 1-butene, 1 pentene, 4-methyl-1-pentene, 1-hexene, and 1-octene. The ethylene-based polymer can have a unimodal or a multimodal molecular weight distribution and can be used alone or in combination with one or more other types of ethylene-based polymers (e.g., a blend of two or more ethylene-based polymers that differ from one another by monomer composition and content, catalytic method of preparation, molecular weight, molecular weight distributions, densities, etc.). If a blend of ethylene-based polymers is employed, the polymers can be blended by any in-reactor or post-reactor process.

The ethylene-based polymer may comprise 50 wt % or greater, 60 wt % or greater, 70 wt % or greater, 80 wt % or greater, 85 wt % or greater, 90 wt % or greater, or 91 wt % or greater, or 92 wt % or greater, or 93 wt % or greater, or 94 wt % or greater, or 95 wt % or greater, or 96 wt % or greater, or 97 wt % or greater, or 97.5 wt % or greater, or 98 wt % or greater, or 99 wt % or greater, while at the same time, 99.5 wt % or less, or 99 wt % or less, or 98 wt % or less, or 97 wt % or less, or 96 wt % or less, or 95 wt % or less, or 94 wt % or less, or 93 wt % or less, or 92 wt % or less, or 91 wt % or less, or 90 wt % or less, or 85 wt % or less, or 80 wt % or less, or 70 wt % or less, or 60 wt % or less of ethylene as measured using Nuclear Magnetic Resonance (NMR) or Fourier-Transform Infrared (FTIR) Spectroscopy. Other units of the ethylene-based polymer may include $C_3$, or $C_4$, or $C_6$, or $C_8$, or $C_{10}$, or $C_{12}$, or $C_{16}$, or $C_{18}$, or $C_{20}$ α-olefins, such as propylene, 1-butene, 1-hexene, 4-methyl-1-pentene, and 1-octene.

The polymeric composition may comprise from 15 wt % to 55 wt % of the ethylene-based polymer. For example, the polymeric composition comprises 15 wt % or greater, or 20 wt % or greater, or 25 wt % or greater, or 30 wt % or greater, or 35 wt % or greater, or 40 wt % or greater, or 45 wt % or greater, or 50 wt % or greater, while at the same time, 55 wt % or less, or 50 wt % or less, or 45 wt % or less, or 40 wt % or less, or 35 wt % or less, or 30 wt % or less, or 25 wt % or less, or 20 wt % or less of the ethylene-based polymer.

The ethylene-based polymer may be a linear low-density polyethylene ("LLDPE"). In LLDPE examples, the polymeric composition may comprise 15 wt % or greater, or 16 wt % or greater, or 17 wt % or greater, or 18 wt % or greater, or 19 wt % or greater, or 20 wt % or greater, or 21 wt % or greater, or 22 wt % or greater, or 23 wt % or greater, or 24 wt % or greater, or 25 wt % or greater, or 26 wt % or greater, or 27 wt % or greater, or 28 wt % or greater, or 29 wt % or greater, while at the same time, 30 wt % or less, or 29 wt % or less, or 28 wt % or less, or 27 wt % or less, or 26 wt % or less, or 25 wt % or less, or 24 wt % or less, or 23 wt % or less, or 22 wt % or less, or 21 wt % or less, or 20 wt % or less, or 19 wt % or less, or 18 wt % or less, or 17 wt % or less, or 16 wt % or less of the of the ethylene-based polymer. The LLDPE examples of the ethylene-based polymer may have a density of 0.910 g/cc or greater, or 0.912 g/cc or greater, or 0.914 g/cc or greater or 0.916 g/cc or greater or 0.918 g/cc or greater, or 0.920 g/cc or greater, or 0.922 g/cc or greater, or 0.924 g/cc or greater or 0.926 g/cc or greater or 0.928 g/cc or greater, while at the same time, 0.930 g/cc or less, or 0.928 g/cc or less, or 0.926 g/cc or less, or 0.924 g/cc or less, or 0.922 g/cc or less, or 0.920 g/cc or less, or 0.918 g/cc or less, or 0.916 g/cc or less, or 0.914 g/cc or less, or 0.912 g/cc or less as measured according to ASTM D792. The LLPDE examples of the ethylene-based polymer may have a melt index ($I_2$) of 0.1 g/10 min. or greater, or 0.2 g/10 min. or greater, or 0.4 g/10 min. or greater, or 0.56 g/10 min. or greater, or 0.6 g/10 min. or greater, or 0.8 g/10 min. or greater, or 1.0 g/10 min. or greater, or 1.2 g/10 min. or greater, or 1.4 g/10 min. or greater, while at the same time, 1.5 g/10 min. or less, or 1.4 g/10 min. or less, or 1.2 g/10 min. or less, or 1.0 g/10 min. or less, or 0.8 g/10 min. or less, or 0.6 g/10 min. or less, or 0.56 g/10 min. or less, or 0.4 g/10 min. or less, or 0.2 g/10 min. or less. The LLPDE examples of the ethylene-based polymer may have a melt index ($I_{21}$)

of 10 g/10 min. or greater, or 20 g/10 min. or greater, or 40 g/10 min. or greater, or 56 g/10 min. or greater, or 60 g/10 min. or greater, or 80 g/10 min. or greater, or 100 g/10 min. or greater, or 120 g/10 min. or greater, or 140 g/10 min. or greater, while at the same time, 150 g/10 min. or less, or 140 g/10 min. or less, or 120 g/10 min. or less, or 100 g/10 min. or less, or 80 g/10 min. or less, or 60 g/10 min. or less, or 56 g/10 min. or less, or 40 g/10 min. or less, or 20 g/10 min. or less.

The ethylene-based polymer may be a plastomer. In plastomer examples, the polymeric composition may comprise 15 wt % or greater, or 16 wt % or greater, or 17 wt % or greater, or 18 wt % or greater, or 19 wt % or greater, while at the same time, 20 wt % or less, or 19 wt % or less, or 18 wt % or less, or 17 wt % or less, or 16 wt % or less of the of the ethylene-based polymer. The plastomer examples of the ethylene-based polymer may have a density of 0.900 g/cc or greater, or 0.901 g/cc or greater, or 0.902 g/cc or greater or 0.903 g/cc or greater or 0.904 g/cc or greater, or 0.905 g/cc or greater, or 0.906 g/cc or greater, or 0.907 g/cc or greater or 0.908 g/cc or greater or 0.909 g/cc or greater, while at the same time, 0.910 g/cc or less, or 0.909 g/cc or less, or 0.908 g/cc or less, or 0.907 g/cc or less, or 0.906 g/cc or less, or 0.905 g/cc or less, or 0.904 g/cc or less, or 0.903 g/cc or less, or 0.902 g/cc or less, or 0.901 g/cc or less as measured according to ASTM D792. The plastomer examples of the ethylene-based polymer may have a melt index ($I_2$) of 0.1 g/10 min. or greater, or 0.2 g/10 min. or greater, or 0.4 g/10 min. or greater, or 0.6 g/10 min. or greater, or 0.8 g/10 min. or greater, or 0.86 g/10 min. or greater, or 1.0 g/10 min. or greater, or 1.2 g/10 min. or greater, or 1.4 g/10 min. or greater, while at the same time, 1.5 g/10 min. or less, or 1.4 g/10 min. or less, or 1.2 g/10 min. or less, or 1.0 g/10 min. or less, or 0.8 g/10 min. or less, or 0.6 g/10 min. or less, or 0.56 g/10 min. or less, or 0.4 g/10 min. or less, or 0.2 g/10 min. or less. The plastomer examples of the ethylene-based polymer may have a melt index ($I_{21}$) of 10 g/10 min. or greater, or 12 g/10 min. or greater, or 14 g/10 min. or greater, or 16 g/10 min. or greater, or 18 g/10 min. or greater, or 20 g/10 min. or greater, or 22 g/10 min. or greater, or 24 g/10 min. or greater, or 26 g/10 min. or greater, or 28 g/10 min. or greater, or 30 g/10 min. or greater, or 32 g/10 min. or greater, or 34 g/10 min. or greater, or 36 g/10 min. or greater, or 38 g/10 min. or greater, while at the same time, 40 g/10 min. or less, or 38 g/10 min. or less, or 36 g/10 min. or less, or 34 g/10 min. or less, or 32 g/10 min. or less, or 30 g/10 min. or less, or 28 g/10 min. or less, or 26 g/10 min. or less, or 24 g/10 min. or less, or 22 g/10 min. or less.

The ethylene-based polymer may be a HDPE. In HDPE examples, the polymeric composition may comprise 45 wt % or greater, or 46 wt % or greater, or 47 wt % or greater, or 48 wt % or greater, or 49 wt % or greater, or 50 wt % or greater, or 51 wt % or greater, or 52 wt % or greater, or 53 wt % or greater, or 54 wt % or greater, while at the same time, 55 wt % or less, or 54 wt % or less, or 53 wt % or less, or 52 wt % or less, or 51 wt % or less, or 50 wt % or less, or 49 wt % or less, or 48 wt % or less, or 47 wt % or less, or 46 wt % or less of the ethylene-based polymer. The HDPE examples of the ethylene-based polymer may have a density of 0.930 g/cc or greater, or 0.932 g/cc or greater, or 0.934 g/cc or greater or 0.936 g/cc or greater or 0.938 g/cc or greater, or 0.940 g/cc or greater, or 0.942 g/cc or greater, or 0.944 g/cc or greater or 0.946 g/cc or greater or 0.948 g/cc or greater, while at the same time, 0.950 g/cc or less, or 0.948 g/cc or less, or 0.946 g/cc or less, or 0.944 g/cc or less, or 0.942 g/cc or less, or 0.940 g/cc or less, or 0.938 g/cc or less, or 0.936 g/cc or less, or 0.934 g/cc or less, or 0.932 g/cc or less as measured according to ASTM D792. The HDPE examples of the ethylene-based polymer may have a melt index ($I_2$) of 0.1 g/10 min. or greater, or 0.2 g/10 min. or greater, or 0.4 g/10 min. or greater, or 0.6 g/10 min. or greater, or 0.8 g/10 min. or greater, or 0.86 g/10 min. or greater, or 1.0 g/10 min. or greater, or 1.2 g/10 min. or greater, or 1.4 g/10 min. or greater, while at the same time, 1.5 g/10 min. or less, or 1.4 g/10 min. or less, or 1.2 g/10 min. or less, or 1.0 g/10 min. or less, or 0.8 g/10 min. or less, or 0.6 g/10 min. or less, or 0.56 g/10 min. or less, or 0.4 g/10 min. or less, or 0.2 g/10 min. or less.

The ethylene-based polymer may be an elastomer. In elastomer examples, the polymeric composition may comprise 10 wt % or greater, or 11 wt % or greater, or 12 wt % or greater, or 13 wt % or greater, or 14 wt % or greater, while at the same time, 15 wt % or less, or 14 wt % or less, or 13 wt % or less, or 12 wt % or less, or 11 wt % or less of the ethylene-based polymer. The elastomer examples of the ethylene-based polymer may have a density of 0.80 g/cc or greater, or 0.81 g/cc or greater, or 0.82 g/cc or greater or 0.83 g/cc or greater or 0.84 g/cc or greater, or 0.85 g/cc or greater, or 0.86 g/cc or greater, or 0.87 g/cc or greater, or 0.874 g/cc or greater, or 0.88 g/cc or greater, or 0.89 g/cc or greater, while at the same time, 0.90 g/cc or less, or 0.89 g/cc or less, or 0.88 g/cc or less, or 0.874 g/cc or less, or 0.87 g/cc or less, or 0.86 g/cc or less, or 0.85 g/cc or less, or 0.84 g/cc or less, or 0.83 g/cc or less, or 0.82 g/cc or less, or 0.81 g/cc or less as measured according to ASTM D792. The elastomer examples of the ethylene-based polymer may have a melt index ($I_2$) of 0.1 g/10 min. or greater, or 0.2 g/10 min. or greater, or 0.4 g/10 min. or greater, or 0.6 g/10 min. or greater, or 0.8 g/10 min. or greater, or 0.86 g/10 min. or greater, or 1.0 g/10 min. or greater, or 1.2 g/10 min. or greater, or 1.4 g/10 min. or greater, while at the same time, 1.5 g/10 min. or less, or 1.4 g/10 min. or less, or 1.2 g/10 min. or less, or 1.0 g/10 min. or less, or 0.8 g/10 min. or less, or 0.6 g/10 min. or less, or 0.56 g/10 min. or less, or 0.4 g/10 min. or less, or 0.2 g/10 min. or less.

It will be understood that two or more of the LLDPE, plastomer, HDPE and elastomer examples of the ethylene-based polymer may be utilized in the polymeric composition without departing from the teachings provided herein.

Polyethylene Glycol

The polymeric composition comprises polyethylene glycol. Polyethylene glycol refers to an oligomer or polymer of ethylene oxide represented by Structure (I):

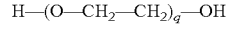  Structure (I)

where q refers to the number of repeat units in the polyethylene glycol polymer. The q value for the polyethylene glycol may be in a range from 200 to 10,000.

The weight average molecular weight of the polyethylene glycol may be 10,000 g/mol or more, or 20,000 g/mol or more, or 30,000 g/mol or more, or 35,000 g/mol or more, or 40,000 g/mol or more, or 45,000 g/mol or more, or 50,000 g/mol or more, or 55,000 g/mol or more, or 60,000 g/mol or more, or 65,000 g/mol or more, or 70,000 g/mol or more, or 75,000 g/mol or more, or 80,000 g/mol or more, or 85,000 g/mol or more, or 90,000 g/mol or more, or 95,000 g/mol or more, while at the same time, 100,000 g/mol or less, or 90,000 g/mol or less, or 85,000 g/mol or less, or 80,000 g/mol or less, or 75,000 g/mol or less, or 70,000 g/mol or less, or 65,000 g/mol or less, or 60,000 g/mol or less, or 55,000 g/mol or less, or 50,000 g/mol or less, or 45,000 g/mol or less, or 40,000 g/mol or less, or 35,000 g/mol or less, or 30,000 g/mol or less, or 25,000 g/mol or less, or 20,000 g/mol or less, or 15,000 g/mol or less as measured by gel permeation chromatography. A blend of different average molecular weight polyethylene glycols, at the same or different weight percent, may be utilized in the polymeric composition.

The polyethylene glycol may be from 0.1 wt % to 2 wt % of the polymeric composition. The polymeric composition may comprise the polyethylene glycol at 0.1 wt % or greater, or 0.2 wt % or greater, or 0.3 wt % or greater, or 0.4 wt % or greater, or 0.5 wt % or greater, or 0.6 wt % or greater, or 0.7 wt % or greater, or 0.8 wt % or greater, or 0.9 wt % or greater, or 1.0 wt % or greater, or 1.1 wt % or greater, or 1.2 wt % or greater, or 1.3 wt % or greater, or 1.4 wt % or greater, or 1.5 wt % or greater, or 1.6 wt % or greater, or 1.7 wt % or greater, or 1.8 wt % or greater, or 1.9 wt % or greater, while at the same time, 2.0 wt % or less, or 1.9 wt % or less, or 1.8 wt % or less, or 1.7 wt % or less, or 1.6 wt % or less, or 1.5 wt % or less, or 1.4 wt % or less, or 1.3 wt % or less, or 1.2 wt % or less, or 1.1 wt % or less, or 1.0 wt % or less, or 0.9 wt % or less, or 0.8 wt % or less, or 0.7 wt % or less, or 0.6 wt % or less, or 0.5 wt % or less, or 0.4 wt % or less, or 0.3 wt % or less, or 0.2 wt % or less.

Copolymer and Ethylene-Based Polymer

As stated above, both the copolymer and the ethylene-based polymer each comprise a comonomer. By tailoring the wt % of comonomer and on what molecular weight fraction of the combined copolymer and ethylene-based polymer the comonomer exists, the polymeric composition may meet or exceed the above-noted target mechanical properties. The portion of the polymer at which the comonomer content should be tailored is the proportion of the polymer with a weight average molecular weight of about $10^5$ g/mol to $10^{5.5}$ g/mol. The proportion of the polymer with a weight average molecular weight of about $10^5$ g/mol to $10^{5.5}$ g/mol is defined herein as the "High Mw Weight Fraction" as explained in greater detail below in the GPC test method.

The polymeric composition may comprise a High Mw Weight Fraction of 0.02 or greater, or 0.04 or greater, or 0.06 or greater, or 0.08 or greater, or 0.10 or greater, or 0.12 or greater, or 0.14 or greater, or 0.16 or greater, or 0.18 or greater, or 0.20 or greater, or 0.22 or greater, or 0.24 or greater, or 0.26 or greater, or 0.28 or greater, while at the same time, 0.30 or less, or 0.28 or less, or 0.26 or less, or 0.24 or less, or 0.22 or less, or 0.20 or less, or 0.18 or less, or 0.16 or less, or 0.14 or less, or 0.12 or less, or 0.10 or less, or 0.08 or less, or 0.06 or less, or 0.04 or less, or 0.02 or less. The weight percent of the High Mw Weight Fraction of the combined copolymer and the ethylene-based polymer is calculated by multiplying the weight fraction value by 100. The average comonomer content of the High Mw Weight Fraction ("High Mw Comonomer Content") is determined from the short-chain branching data acquired via the GPC, as described below in the GPC test method. The polymeric composition may comprise a High Mw Comonomer Content of 3.2 wt % or greater, or 3.4 wt % or greater, or 3.6 wt % or greater, or 3.8 wt % or greater, or 4.0 wt % or greater, or 4.2 wt % or greater, or 4.4 wt % or greater, or 4.6 wt % or greater, or 4.8 wt % or greater, or 5.0 wt % or greater, or 5.2 wt % or greater, or 5.4 wt % or greater, or 5.6 wt % or greater, or 5.8 wt % or greater, while at the same time, 6.0 wt % or less, or 5.8 wt % or less, or 5.6 wt % or less, or 5.4 wt % or less, or 5.2 wt % or less, or 5.0 wt % or less, or 4.8 wt % or less, or 4.6 wt % or less, or 4.4 wt % or less, or 4.2 wt % or less, or 4.0 wt % or less, or 3.8 wt % or less, or 3.6 wt % or less, or 3.4 wt % or less.

The product of the High Mw Weight Fraction and High Mw Comonomer Content, defined as "Relevant Comonomer Content", thus represents the weight percent of the total mass of comonomer present in all chains of total size Log 10 of Mw between 5.00 and 5.50, as compared to the total mass of the polymeric composition. The polymeric composition may comprise a Relevant Comonomer Content of 0.6 wt % or greater, or 0.8 wt % or greater, or 1.0 wt % or greater, or 1.2 wt % or greater, or 1.4 wt % or greater, or 1.6 wt % or greater, or 1.8 wt % or greater, or 2.0 wt % or greater, or 2.2 wt % or greater, or 2.4 wt % or greater, or 2.6 wt % or greater, or 2.8 wt % or greater, or 3.0 wt % or greater, or 3.2 wt % or greater. Put another way, the total comonomer contained within the portion having a molecular weight in the range of $10^5$ g/mol to $10^{5.5}$ g/mol as measured by GPC is at least 0.6 wt % of the total weight of the polymeric composition.

Mechanical Properties

The polymeric composition may exhibit a retained tensile elongation at break after aging, as described in greater detail below, of greater than 75%. For example, the retained elongation at break of the polymeric composition may be 76% or greater, or 80% or greater, or 85% or greater, or 90% or greater, or 95% or greater, or 100 or greater, while at the same time, $10^5$% or less, or 100% or less, or 95% or less, or 90% or less, or 85% or less, or 80% or less.

The polymeric composition may exhibit an ESCR, as explained in greater detail below, of greater than 400 hours. For example, the polymeric composition may exhibit an ESCR of 400 hours or greater, or 450 hours or greater, or 500 hours or greater, or 600 hours or greater, or 700 hours or greater, or 800 hours or greater, or 900 hours or greater, or 1000 hours or greater, or 1100 hours or greater, or 1200 hours or greater, or 1300 hours or greater, or 1400 hours or greater, or 1500 hours or greater, or 1600 hours or greater, or 1700 hours or greater, or 1800 hours or greater, or 1900 hours or greater, while at the same time, 2000 hours or less, or 1900 hours or less, or 1800 hours or less, or 1700 hours or less, or 1600 hours or less, or 1500 hours or less, or 1400 hours or less, or 1300 hours or less, or 1200 hours or less, or 1100 hours or less, or 1000 hours or less, or 900 hours or less, or 800 hours or less, or 700 hours or less, or 600 hours or less, or 500 hours or less, or 450 hours or less.

The polymeric composition may exhibit a cyclic temperature shrinkback, as explained in greater detail below, of less than 2.50%. For example, the cyclic temperature shrinkback of the polymeric composition may be 2.45% or less, or 2.40% or less, or 2.35% or less, or 2.30% or less, or 2.25% or less, or 2.20% or less, or 2.15% or less, or 2.10% or less, or 2.05% or less, or 2.00% or less, or 1.95% or less, or 1.90% or less, or 1.85% or less, or 1.80% or less, or 1.75% or less, or 1.70% or less, or 1.65% or less, or 1.60% or less, or 1.55% or less, while at the same time, 1.50% or more, or 1.55% or more, or 1.60% or more, or 1.65% or more, or 1.70% or more, or 1.75% or more, or 1.80% or more, or 1.85% or more, or 1.90% or more, or 1.95% or more, or 2.00% or more, or 2.05% or more, or 2.10% or more, or 2.15% or more, or 2.20% or more, or 2.25% or more, or 2.30% or more, or 2.35% or more, or 2.40% or more.

Additives

The polymeric composition may comprise additional additives in the form of antioxidants, processing aids, coupling agents, ultraviolet stabilizers (including UV absorbers), antistatic agents, carbon black, additional nucleating agents, slip agents, lubricants, viscosity control agents, tackifiers, anti-blocking agents, surfactants, extender oils, acid scavengers, flame retardants and metal deactivators. The polymeric composition may comprise from 0.01 wt % to 5 wt % of one or more of the additional additives. The additives may be added individually as neat components, may be combined and/or may be added in one or more masterbatches.

The polymeric composition comprises one or more hindered amine light stabilizers. HALS are chemical compounds containing an amine functional group that are used as stabilizers in plastics and polymers. These compounds may be derivatives of tetramethylpiperidine and are primarily used to protect the polymers from the effects of free radical oxidation due to exposure to UV light. The HALS may include one or more of poly(4-hydroxy-2,2,6,6-tetramethyl-1-piperidineethanol-alt-1,4-butanedioic acid) (CAS #65447-77-0); bis(2,2,6,6-tetramethyl-4-piperidyl) sebacate (CAS #52829-07-9); di-(1,2,2,6,6-pentamethyl-4-piperidyl)-2-butyl-2-(3,5-di-tert-butyl-4-hydroxybenzyl)malonate (CAS #63843-89-0); bis(1-octyloxy-2,2,6,6-tetramethyl-4-piperidyl) sebacate (CAS #129757-67-1); poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino] (CAS #71878-19-8); 1,3,5-Triazine-2,4,6-triamine, N,N'''-1,2-ethanediylbis[N-[3-[[4,6-bis[butyl(1,2,2,6,6-pentamethyl-4-piperidinyl)amino]-1,3,5-triazin-2-yl]amino]propyl]-N',N''-dibutyl-N',N''-bis(1,2,2,6,6-pentamethyl-4-piperidinyl)- (CAS #106990-43-6); 1,6-Hexanediamine, N,N'-bis(2,2,6,6-tetramethyl-4-piperidinyl)-, polymer with 2,4,6-trichloro-1,3,5-triazine, reaction products with, N-butyl-1-butanamine and N-butyl-2,2,6,6-tetramethyl-4-piperidinamine (CAS #192268-64-7). Examples of the HALS are commercially available under the tradenames TINUVIN™ 622 and CHIMASSORB™ 944 from BASF, Ludwigshafen, Germany. The polymeric composition may comprise from 0.1 wt % to 1.0 wt % of the HALS based on the total weight of the polymeric composition. For example, the polymeric composition may comprise 0.1 wt % or greater, or 0.2 wt % or greater, or 0.3 wt % or greater, or 0.4 wt % or greater, or 0.5 wt % or greater, or 0.6 wt % or greater, or 0.7 wt % or greater, or 0.8 wt % or greater, or 0.9 wt % or greater, while at the same time, 1.0 wt % or less, or 0.9 wt % or less, or 0.8 wt % or less, or 0.7 wt % or less, or 0.6 wt % or less, or 0.5 wt % or less, or 0.4 wt % or less, or 0.3 wt % or less, or 0.2 wt % or less of the HALS based on the total weight of the polymeric composition.

The polymeric composition can include one or more particulate fillers, such as glass fibers or various mineral fillers including nano-composites. Fillers, especially those with elongated or platelet-shaped particles providing a higher aspect ratio (length/thickness), may improve modulus and post-extrusion shrinkage characteristics. The filler(s) can have a median size or d50 of less than 20 µm, less than 10 µm, or less than 5 µm. The fillers may be surface treated to facilitate wetting or dispersion in the polymeric composition. Specific examples of suitable fillers include, but are not limited to, calcium carbonate, silica, quartz, fused quartz, talc, mica, clay, kaolin, wollastonite, feldspar, aluminum hydroxide, and graphite. Fillers may be included in the polymeric composition in an amount ranging from 2 to 30 wt %, or from 5 to 30 wt % based on the total weight of the polymeric composition.

The processing aids may comprise metal salts of fluororesin such as polytetrafluoroethylene or fluorinated ethylene propylene; carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non-ionic surfactants; silicone fluids and polysiloxanes.

The antioxidants may comprise hindered phenols such as tetrakis[methylene(3,5-di-tert-butyl-4-hydroxyhydro-cinnamate)]methane; bis[(beta-(3,5-ditert-butyl-4-hydroxybenzyl) methylcarboxyethyl)]-sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)-hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-dimethylbenzyl)diphenylamine, diphenyl-p-phenylenediamine, mixed di-aryl-p-phenylenediamines, and other hindered amine anti-degradants or stabilizers.

Compounding and Coated Conductor Formation

The components of the polymeric composition can be added to a batch or continuous mixer for melt blending to form a melt-blended composition. The components can be added in any order or first preparing one or more masterbatches for blending with the other components. The melt blending may be conducted at a temperature above the melting point of the highest melting polymer. The melt-blended composition is then delivered to an extruder or an injection-molding machine or passed through a die for shaping into the desired article, or converted to pellets, tape, strip or film or some other form for storage or to prepare the material for feeding to a next shaping or processing step. Optionally, if shaped into pellets or some similar configuration, then the pellets, etc. can be coated with an anti-block agent to facilitate handling while in storage.

Examples of compounding equipment used include internal batch mixers, such as a BANBURY™ or BOLLING™ internal mixer. Alternatively, continuous single, or twin screw, mixers can be used, such as FARRELL™ continuous mixer, a WERNER™ and PFLEIDERER™ twin screw mixer, or a BUSS™ kneading continuous extruder. The type of mixer utilized, and the operating conditions of the mixer, will affect properties of the composition such as viscosity, volume resistivity, and extruded surface smoothness.

A coated conductor may be made from the polymeric composition. The coated conductor includes a conductor and a coating. The coating including the polymeric composition. The polymeric composition is at least partially disposed around the conductor to produce the coated conductor. The conductor may comprise a conductive metal or an optically transparent structure.

The process for producing a coated conductor includes mixing and heating the polymeric composition to at least the melting temperature of the polymeric components in an extruder to form a polymeric melt blend, and then coating the polymeric melt blend onto the conductor. The term "onto" includes direct contact or indirect contact between the polymeric melt blend and the conductor. The polymeric melt blend is in an extrudable state.

The polymeric composition is disposed on and/or around the conductor to form a coating. The coating may be one or more inner layers such as an insulating layer. The coating may wholly or partially cover or otherwise surround or encase the conductor. The coating may be the sole component surrounding the conductor. Alternatively, the coating may be one layer of a multilayer jacket or sheath encasing the conductor. The coating may directly contact the conductor. The coating may directly contact an insulation layer surrounding the conductor.

EXAMPLES

Materials

The following materials are employed in the Examples, below.

Copolymer is an ethylene-hexene copolymer having a density of 0.955 g/cc, a melt index ($I_2$) of 1.5 g/10 min., and a melt index ($I_{21}$) 106 g/10 min. and is available from The Dow Chemical Company, Midland, MI.

EP1 is a UNIPOL™ gas phase unimodal ethylene-butene polymer having a density of 0.920 g/cc, a melt index ($I_2$) of 0.56 g/10 min., and a melt index ($I_{21}$) 56 g/10 min.

EP2 is a UNIPOL™ gas phase unimodal ethylene-butene polymer (plastomer) having a density of 0.904 g/cc, a melt index ($I_2$) of 0.85 g/10 min., and a melt index ($I_{21}$) 24 g/10 min.

EP3 is an ethylene-butene polymer (elastomer) having a density of 0.874 g/cc, a melt index ($I_2$) of 0.8 g/10 min. and is available from The Dow Chemical Company, Midland, MI. EP4 is an ethylene-octene polymer having a density of 0.94 g/cc, a melt index ($I_2$) of 0.85 g/10 min. and is available from The Dow Chemical Company, Midland, MI.

CBMB is a carbon black masterbatch comprising 45 wt % carbon black and is available from The Dow Chemical Company, Midland, MI.

PEG is polyethylene glycol having a weight average molecular weight of 20,000 g/mol and is available from Clariant, Germany.

A01 is 4,4'-Thiobis(2-t-butyl-5-methylphenol) commercially available under the tradename LOWINOX™ TBM-6 and is available from Addivant, Danbury, CT.

A02 is a sterically hindered phenolic antioxidant having the chemical name pentaerythritol tetrakis(3-(3,5-di-tert-butyl-4-hydroxyphenyl)propionate), that is commercially available as IRGANOX 1010™ from BASF, Ludwigshafen, Germany.

A03 is a hydrolytically stable phosphite processing stabilizer having the chemical name tris(2,4-ditert-butylphenyl)phosphite, that is commercially available as IRGAFOS® 168 from BASF, Ludwigshafen, Germany.

PA is a fluororesin processing aid commercially available under the tradename DYNAMAR™ FX 5912 available from 3M, Saint Paul, Minnesota, USA.

Sample Preparation

Inventive examples ("IE") 1-6 and comparative examples ("CE") 1-5 were compounded on a mini-BANBURY (1.2 kg) or BANBURY (12 kg) batch mixer from HF Mixing Group. The drop temperature was 150° C. After compounding, the samples were extruded and pelletized. CE4 was a pre-compounded and pelletized sample.

The pelletized samples were formed into plaques and jackets for different mechanical tests. Plaques were prepared by compression molding pellets on a pre-heated Arbor press at 180° C. The pellets were placed into molds of different thickness per testing requirements. The samples were heated to 180° C. for 4 minutes, then pressed for 3 minutes at 3.45 mega pascals (MPa) followed by 3 minutes at 17.24 MPa. Samples were cooled in the press at 15° C./minute to 23° C. and then removed. Jacket samples were prepared via extrusion of the polymeric composition onto a conductor using a 6.35 cm wire extrusion line from Davis-Standard at 91 meters per minute with a 0.05 cm wall thickness at 180° C.-240° C. The conductor was removed, and the jacket samples were conditioned at room temperature for 24 hours before tensile testing.

Heat aging of the samples for tensile elongation at break was conducted by preheating a Type I oven (according to ASTM D5423) to 100° C. Samples were then loaded into the pre-heated oven and aged for 10 days. After aging, the samples were then conditioned at 23° C. at 50% relative humidity for 24 hours.

Test Methods

Triple Detector Gel Permeation Chromatography (GPC) was performed using a chromatographic system. The chromatographic system consisted of a PolymerChar GPC-IR (Valencia, Spain) high temperature GPC chromatograph equipped with an internal IR5 infra-red detector (IR5) and 4-capillary viscometer (DV) coupled to a Agilent Technologies 2-angle laser light scattering (LS) detector Model 2040. For all Light scattering measurements, the 15 degree angle is used for measurement purposes. The autosampler oven compartment was set at 160° Celsius and the column compartment was set at 150° Celsius. The columns used were 4 Agilent "Mixed A" 30 cm 20-micron linear mixed-bed columns. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration and calculation of the conventional molecular weight moments and the distribution (using the 20 um "Mixed A" columns) were performed according to the method described in the Conventional GPC procedure.

The Systematic Approach for the determination of multi-detector offsets is done in a manner consistent with that published by Balke, Mourey, et. al. (Mourey and Balke, Chromatography Polym. Chpt 12, (1992)) (Balke, Thitiratsakul, Lew, Cheung, Mourey, Chromatography Polym. Chpt 13, (1992)), optimizing triple detector log (MW and IV) results from a broad homopolymer polyethylene standard (Mw/Mn>3) to the narrow standard column calibration results from the narrow standards calibration curve using PolymerChar GPCOne™ Software. As used herein, "MW" refers to molecular weight.

The absolute molecular weight data was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, NY (1987)) using PolymerChar GPCOne™ software. The overall injected concentration, used in the determination of the molecular weight, was obtained from the mass detector area and the mass detector constant, derived from a suitable linear polyethylene homopolymer, or one of the polyethylene standards of known weight-average molecular weight. The calculated molecular weights (using GPCOne™) were obtained using a light scattering constant, derived from one or more of the polyethylene standards mentioned below, and a refractive index concentration coefficient, do/dc, of 0.104. Generally, the mass detector response (IR5) and the light scattering constant (determined using GPCOne™) should be determined from a linear standard with a molecular weight in excess of about 50,000 g/mole. The viscometer calibration (determined using GPCOne™) can be accomplished using the methods described by the manufacturer, or, alternatively, by using the published values of suitable linear standards, such as Standard Reference Materials (SRM) 1475a (available from National Institute of Standards and Technology (NIST)). A viscometer constant (obtained using GPCOne™)

is calculated which relates specific viscosity area (DV) and injected mass for the calibration standard to its intrinsic viscosity (IV). The chromatographic concentrations are assumed low enough to eliminate addressing 2nd viral coefficient effects (concentration effects on molecular weight).

The absolute weight average molecular weight (Mw (Abs)) is obtained (using GPCOne™) from the Area of the Light Scattering (LS) integrated chromatogram (factored by the light scattering constant) divided by the mass recovered from the mass constant and the mass detector (IR5) area. The molecular weight and intrinsic viscosity responses are extrapolated at chromatographic ends where signal to noise becomes low (using GPCOne™). Other respective moments, $Mn_{(Abs)}$ and $Mz_{(Abs)}$ are be calculated according to equations 1-2 as follows:

$$Mn_{(Abs)} = \frac{\sum^i IR_i}{\sum_i (IR_i / M_{Absolute_i})} \quad (EQ\ 1)$$

$$Mz_{(Abs)} = \frac{\sum^i (IR_i * M_{Absolute_i}^2)}{\sum_i (IR_i * M_{Absolute_i})} \quad (EQ\ 2)$$

Conventional GPC: The chromatographic system consisted of a PolymerChar GPC-IR (Valencia, Spain) high temperature GPC chromatograph equipped with an internal IR5 infra-red detector (IR5) coupled to a Precision Detectors (Now Agilent Technologies) 2-angle laser light scattering (LS) detector Model 2040. For all Light scattering measurements, the 15 degree angle is used for measurement purposes. The autosampler oven compartment was set at 160° Celsius and the column compartment was set at 150° Celsius. The columns used were 4 Agilent "Mixed A" 30 cm 20-micron linear mixed-bed columns. The chromatographic solvent used was 1,2,4 trichlorobenzene and contained 200 ppm of butylated hydroxytoluene (BHT). The solvent source was nitrogen sparged. The injection volume used was 200 microliters and the flow rate was 1.0 milliliters/minute.

Calibration of the GPC column set was performed with 21 narrow molecular weight distribution polystyrene standards with molecular weights ranging from 580 g/mol to 8,400,000 g/mol and were arranged in 6 "cocktail" mixtures with at least a decade of separation between individual molecular weights. The standards were purchased from Agilent Technologies. The polystyrene standards were prepared at 0.025 grams in 50 milliliters of solvent for molecular weights equal to or greater than 1,000,000 g/mol, and 0.05 grams in 50 milliliters of solvent for molecular weights less than 1,000,000 g/mol. The polystyrene standards were dissolved at 80 degrees Celsius with gentle agitation for 30 minutes. The polystyrene standard peak molecular weights were converted to polyethylene molecular weights using Equation 1 (as described in Williams and Ward, J. Polym. Sci., Polym. Let., 6, 621 (1968)):

$$MW_{polyethylene} = A \times (Mw_{polystyrene})^B \quad (EQ3)$$

where MW is the molecular weight, A has a value of 0.4315 and B is equal to 1.0.

A fifth order polynomial was used to fit the respective polyethylene-equivalent calibration points. A small adjustment to A (from approximately 0.395 to 0.440) was made to correct for column resolution and band-broadening effects such that of a linear homopolymer polyethylene standard is obtained at 120,000 g/mol Mw.

The total plate count of the GPC column set was performed with decane (prepared at 0.04 g in 50 milliliters of TCB.) The plate count (Equation 4) and symmetry (Equation 5) were measured on a 200 microliter injection according to the following equations:

$$\text{Plate Count} = 5.54 * \left( \frac{RV_{Peak\ Max}}{\text{Peak Width at } \frac{1}{2} \text{height}} \right)^2 \quad (EQ\ 4)$$

where RV is the retention volume in milliliters, the peak width is in milliliters, the peak max is the maximum height of the peak, and ½ height is ½ height of the peak maximum.

$$\text{Symmetry} = \frac{(\text{Rear Peak } RV_{one\ tenth\ height} - RV_{Peak\ max})}{(RV_{Peak\ max} - \text{Front Peak } RV_{one\ tenth\ height})} \quad (EQ\ 5)$$

where RV is the retention volume in milliliters and the peak width is in milliliters, Peak max is the maximum position of the peak, one tenth height is 1/10 height of the peak maximum, and where rear peak refers to the peak tail at later retention volumes than the peak max and where front peak refers to the peak front at earlier retention volumes than the peak max. The plate count for the chromatographic system should be greater than 24,000 and symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. The samples were dissolved for 2 hours at 160° Celsius under "low speed" shaking.

The calculations of Mn(conv), Mw(conv), and Mz(conv) were based on GPC results using the internal IR5 detector (measurement channel) of the PolymerChar GPC-IR chromatograph according to Equations 6-8, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1.

$$Mn(conv) = \frac{\sum^i IR_i}{\sum^i (IR_i / M_{polyethylene_i})} \quad (EQ\ 6)$$

$$Mw(conv) = \frac{\sum^i (IR_i * M_{polyethylene_i})}{\sum^i IR_i} \quad (EQ\ 7)$$

$$Mz(conv) = \frac{\sum^i (IR_i * M_{polyethylene_i}^2)}{\sum^i (IR_i * M_{polyethylene_i})} \quad (EQ\ 8)$$

In order to monitor the deviations over time, a flowrate marker (decane) was introduced into each sample via a micropump controlled with the PolymerChar GPC-IR system. This flowrate marker (FM) was used to linearly correct the pump flowrate (Flowrate(nominal)) for each sample by RV alignment of the respective decane peak within the sample (RV(FM Sample)) to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system based on a flow marker peak, the effective flowrate (with respect to the narrow standards calibration) is calculated as Equation 9. Processing of the flow marker peak was done via the PolymerChar GPCOne™ Software. Acceptable flowrate correction is such that the effective flowrate should be within +/−2% of the nominal flowrate.

$$\text{Flowrate(effective)} = \text{Flowrate(nominal)} * (\text{RV(FM Calibrated)}/\text{RV(FM Sample)}) \quad (EQ9)$$

A calibration for the IR5 detector rationing was performed using at least ten ethylene-based polymer standards (polyethylene homopolymer and ethylene/octene copolymers) of known short chain branching (SCB) frequency (as measured by 13C NMR), ranging from homopolymer (0 SCB/1000 total C) to approximately 40 SCB/1000 total C, where total C=carbons in backbone+carbons in branches. Each standard had a weight-average molecular weight from 36,000 g/mole to 126,000 g/mole, as determined by the GPC-LALS processing method described above. Each standard had a molecular weight distribution (Mw/Mn) from 2.0 to 2.5, as determined by the GPC-LALS processing method described above.

The "IR5 Area Ratio (or "IR5 Methyl Channel Area/IR5 Measurement Channel Area")" Of "the baseline-subtracted area response of the IR5 methyl channel sensor" to "the baseline-subtracted area response of IR5 measurement channel sensor" (standard filters and filter wheel as supplied by PolymerChar: Part Number IR5 FWM01 included as part of the GPC-IR instrument) was calculated for each of the "SCB" standards. A linear fit of the SCB frequency versus the "IR5 Area Ratio" was constructed in the form of Equation 10:

$$\text{SCB}/1000 \text{ total } C = A_0 + [A_1 \times (\text{IR5}_{Methyl\ Channel\ Area}/\text{IR5}_{Measurement\ Channel\ Area})] \quad (EQ10)$$

In Equation 10, $A_0$ is the "SCB/1000 total C" intercept at an "IR5 Area Ratio" of zero, and $A_1$ is the slope of the "SCB/1000 total C" versus "IR5 Area Ratio" and represents the increase in the SCB/1000 total C as a function of "IR5 Area Ratio."

"A series of linear baseline-subtracted chromatographic heights" for the chromatogram generated by the "IR5 methyl channel sensor" was established as a function of column elution volume, to generate a baseline-corrected chromatogram (methyl channel). "A series of linear baseline-subtracted chromatographic heights" for the chromatogram generated by the "IR5 measurement channel" was established as a function of column elution volume, to generate a base-line-corrected chromatogram (measurement channel).

The "IR5 Height Ratio" of "the baseline-corrected chromatogram (methyl channel)" to "the baseline-corrected chromatogram (measurement channel)" was calculated at each column elution volume index (each equally-spaced index, representing 1 data point per second at 1 ml/min elution) across the sample integration bounds. The "IR5 Height Ratio" was multiplied by the coefficient $A_1$, and the coefficient $A_0$ was added to this result, to produce the predicted SCB frequency of the sample. The result was converted into mole percent comonomer as follows in Equation 11:

$$\text{mol \% comonomer} = \frac{SCB_f}{\left(SCB_f + \left(1000 - SCB_f * \frac{\text{comonomer length}}{2}\right)\right)} \quad (EQ\ 11)$$

In Equation 11, "$SCB_f$" is the "SCB per 1000 total C", and the "comonomer length"=8.

The mol % comonomer is then converted to wt % comonomer by using the molecular weights of octene and ethylene.

Via the above method, a wt % comonomer can be calculated for a sample or for any portion of a sample. The use of this technique in combination with the conventional GPC analysis allows for wt % comonomer to be determined as a function of molecular weight ($C8_i$).

The High Mw Weight Fraction is determined from the conventional GPC method described above. The High Mw Weight Fraction is the total mass fraction measured to possess a Log 10 of Mw at least 5.00 and less than 5.50, based on conventional GPC, as shown in Equation 12.

$$\text{High } Mw \text{ Weight Fraction} = \frac{\sum^i_{5 \leq \log(M_{polyethylene_i}) < 5.5} IR_i}{\sum^i IR_i} \quad (EQ\ 12)$$

The High Mw Comonomer Content was calculated by using the weighted average comonomer wt % reported over the range of these molecular weights, as shown in Equation 13.

$$\text{High } Mw \text{ Comonomer Content} = \frac{\sum^i_{5 \leq \log(M_{polyethylene_i}) < 5.5} IR_i * C8_i}{\text{High } Mw \text{ Weight Fraction}} \quad (EQ\ 13)$$

The product of the High Mw Weight Fraction with the High Mw Comonomer Content is the weight fraction of the resin consisting of comonomer included within polymer chains of the specified molecular weight. This product is the Relevant Comonomer.

Elongation at break was measured according to IEC 60811-501 on plaque samples at 25 mm/min. with an extensometer.

Density was measured according to ASTM D792 at 23° C.

Melt indexes were measured per ASTM D1238 at 190° C. with either a 2.16 kg (12) load or a 21.6 kg load ($I_{21}$) as specified.

ESCR was measured according to IEC 60811-406 (2012), method B, without oven conditioning of the test samples. 52 g of the sample were introduced into a frame with dimensions 150 mm*180 mm*1.9 mm. An initial force of <1 kilonewton ("kN") was applied at 170° C. Next a force of 200 kN was applied for 2 minutes while the sample was held at 170° C. After 2 minutes had expired, cooling cassettes were moved into the press and the temperature reduced to 40° C.

Cyclic temperature shrinkback testing was performed on jacket samples. Cyclic temperature shrinkback was conducted by conditioning the jacket sample in an oven at a ramp rate of 0.5° C./min. from 40° C. to 100° C. The sample was held at 100° C. for 60 minutes and then the temperature was ramped back down to 40° C. at a rate of 0.5° C./min. The jacket was held at 40° C. for 20 minutes and the temperature cycle was then repeated four more times for a total of five cycles. Shrinkage is reported as a percent change in length of the jacket from prior to testing to after testing and was measured using a ruler precise to 1.6 mm on 61 cm long specimens.

Results

Table 1 provides the compositional data of IE1-IE6 and CE1-CE4. Table 2 provides the mechanical testing results of IE1-IE6 and CE1-CE4 as well as the target value for the mechanical properties. Tensile elongation at break is provided for both unaged ("TE") and heat aged samples ("Aged TE"). The retained elongation at break after aging ("Retained TE") is calculated by dividing the Aged TE value by the TE value of a sample. The entry "nm" represents that a particular property was not measured.

based polymer. CE1 demonstrates that despite having the same constituents as IE1, IE4 and IE5 and in similar concentrations, the Relevant Comonomer Content is below 0.6 wt % and thus is unable to meet the ESCR target value. CE2 demonstrates that the incorporation of polyethylene glycol aids in achieving the ESCR target. CE3 and CE4 each demonstrate that a High Mw Comonomer Content below 3.2 wt % fails to produce a sample that meets every target value for the mechanical properties. Further, CE3 and CE4 each demonstrate that a Relevant Comonomer Content below 0.6 wt % fails to produce a sample that meets every target value for the mechanical properties.

What is claimed is:

1. A polymeric composition, comprising:
   (i) a copolymer of ethylene and an alpha olefin comonomer, the copolymer having a density of 0.945 g/cc to 0.960 g/cc;
   (ii) an ethylene-based polymer; and
   (iii) polyethylene glycol,
   wherein the combination of (i) and (ii) has a High Mw Comonomer Content of 3.2 wt % or greater based on a total weight of the combined (i) and (ii) over the weight average molecular weight range of $10^5$ g/mol to $10^{5.5}$ g/mol as measured by GPC,
   wherein 15 wt % or greater of the total weight of the polymeric composition is the combined (i) and (ii) having a molecular weight in the range of $10^5$ g/mol to $10^{5.5}$ g/mol as measured by GPC,
   wherein the polymeric composition has a Relevant Comonomer Content of 0.6 wt % or greater, and

TABLE 1

| Component (wt %) | IE1 | IE2 | IE3 | IE4 | IE5 | IE6 | CE1 | CE2 | CE3 | CE4 |
|---|---|---|---|---|---|---|---|---|---|---|
| Copolymer | 65.14 | 74.49 | 41.86 | 69.79 | 74.58 | 81.02 | 79.24 | 70.60 | 55.93 | 93.23 |
| EP1 | 27.92 | 0 | 0 | 23.26 | 18.65 | 0 | 13.98 | 23.53 | 0 | 0 |
| EP2 | 0 | 18.556 | 0 | 0 | 0 | 0 | 0 | 0 | 0 | 0 |
| EP3 | 0 | 0 | 0 | 0 | 0 | 12.03 | 0 | 0 | 0 | 0 |
| EP4 | 0 | 0 | 51.19 | 0 | 0 | 0 | 0 | 0 | 37.29 | 0 |
| CBMB | 5.67 | 5.67 | 5.67 | 5.67 | 5.67 | 5.67 | 5.67 | 5.67 | 5.67 | 5.67 |
| PEG | 0.9 | 0.9 | 0.9 | 0.9 | 0.9 | 0.9 | 0.9 | 0 | 0.9 | 0.9 |
| AO1 | 0 | 0 | 0 | 0 | 0.18 | | 0.18 | 0.18 | 0.18 | 0.18 |
| AO2 | 0.18 | 0.18 | 0.18 | 0.18 | 0 | 0.18 | 0 | 0 | 0 | 0 |
| AO3 | 0.18 | 0.18 | 0.18 | 0.18 | 0 | 0.18 | 0 | 0 | 0 | 0 |
| PA | 0.02 | 0.02 | 0.02 | 0.02 | 0.02 | 0.02 | 0.02 | 0.02 | 0.02 | 0.02 |
| High Mw Comonomer Content (wt %) | 5.18 | 6.99 | 3.26 | ≈4.63 * | ≈4.07 * | 10.49 | 3.22 | nm | 2.99 | 1.88 |
| High Mw Weight Fraction | 0.179 | 0.190 | 0.201 | ≈0.179* | ≈0.179* | 0.192 | 0.173 | nm | 0.195 | 0.180 |
| Relevant Comonomer (wt %) | 0.92 | 1.33 | 0.66 | 0.83 | 0.73 | 2.02 | 0.56 | nm | 0.58 | 0.34 |

* Calculated by interpolation from IE1 and CE4

TABLE 2

| Property | Target | IE1 | IE2 | IE3 | IE4 | IE5 | IE6 | CE1 | CE2 | CE3 | CE4 |
|---|---|---|---|---|---|---|---|---|---|---|---|
| TE(%) | | 1048 ± 22 | 988 ± 15 | 849 ± 18 | 1064 ± 51 | 1057 ± 37 | 932 ± 18 | 1005 ± 101 | 1083 ± 18 | 797 ± 18 | 822 ± 37 |
| AgedTE(%) | | 1014 ± 42 | 1014 ± 41 | 829 ± 75 | 1010 ± 25 | 835 ± 61 | 965 ± 10 | 786 ± 107 | 912 ± 77 | 586 ± 212 | 549 ± 225 |
| Retained TE (%) | >75% | 97 | 103 | 98 | 95 | 79 | 104 | 78 | 84 | 74 | 67 |
| Density (g/cc) | >0.945 | 0.957 | | 0.959 | 0.959 | 0.960 | nm | 0.960 | nm | nm | 0.966 |
| ESCR (hours) | >400 | <1115 | >1632 | >1632 | <648 | <456 | <648 | <264 | <168 | <624 | <360 |
| Cyclic temperature shrinkback (%) | <2.5% | 2.32 ± 0.09 | 2.13 ± 0.09 | 2.00 ± 0.09 | 2.22 ± 0 | nm | 2.29 ± 0.09 | nm | nm | nm | 2.13 ± 0.09 |

Referring now to Table 1 and Table 2, IE1-IE6 are able to exceed the target values for each mechanical property while CE1-CE4 each fail to meet at least one target mechanical property value. IE1-IE6 demonstrate that a variety of ethylene-based polymers in a variety of concentrations can meet the mechanical property targets as long as the High Mw Comonomer Content is 3.2 wt % or greater and the Relevant Comonomer Content is 0.6 wt % or greater based on a total weight of the combined copolymer and ethylene-wherein the polymeric composition has a density of 0.945 g/cc or greater as measured according to ASTM D792.

2. The polymeric composition of claim 1, wherein the polymeric composition comprises from 35 wt % to 85 wt % of the copolymer based on the total weight of the polymeric composition.

3. The polymeric composition of claim 1, wherein the polymeric composition comprises from 0.5 wt % to 1 wt % of the polyethylene glycol based on the total weight of the polymeric composition and the polyethylene glycol.

4. The polymeric composition of claim 1, wherein the polymeric composition comprises from 15 wt % to 30 wt % of the ethylene-based polymer based on the total weight of the polymeric composition, and the ethylene based polymer is a linear low-density polyethylene having a density of 0.91 g/cc to 0.93 g/cc as measured according to ASTM D792.

5. The polymeric composition of claim 1, wherein the polymeric composition comprises from 15 wt % to 19 wt % of the ethylene based polymer based on the total weight of the polymeric composition and the ethylene based polymer is a plastomer having a density of 0.90 g/cc to 0.91 g/cc as measured according to ASTM D792.

6. The polymeric composition of claim 1, wherein the polymeric composition comprises from 45 wt % to 55 wt % of the ethylene-based polymer based on the total weight of the polymeric composition and the ethylene-based polymer is a high-density polyethylene having a density of 0.93 g/cc to 0.95 g/cc as measured according to ASTM D792.

7. The polymeric composition of claim 1, wherein the polymeric composition comprises from 10 wt % to 15 wt % of the ethylene-based polymer based on the total weight of the polymeric composition and the ethylene based polymer is an elastomer having a density of 0.80 g/cc to 0.90 g/cc as measured according to ASTM D792.

8. The polymeric composition of claim 1, wherein the combination of (i) and (ii) has a High Mw Comonomer Content of 12.0 wt % or less over the molecular weight range of $10^5$ g/mol to $10^{5.5}$ g/mol as measured by GPC.

9. The polymeric composition of claim 1, wherein 30 wt % or less of the total weight of the polymeric composition is the combined (i) and (ii) having a molecular weight in the range of $10^5$ g/mol to $10^{5.5}$ g/mol as measured by GPC.

10. A coated conductor comprising:
a conductor; and
the polymeric composition of claim 1 disposed at least partially around the conductor.

\* \* \* \* \*